UNITED STATES PATENT OFFICE.

HENRY S. DELAMERE, OF FERNDALE, CALIFORNIA.

INSECTICIDE.

No. 897,197.     Specification of Letters Patent.     Patented Aug. 25, 1908.

Application filed October 30, 1907. Serial No. 399,893.

*To all whom it may concern:*

Be it known that I, HENRY S. DELAMERE, a citizen of the United States, residing at Ferndale, in the county of Humboldt, State of California, have invented certain new and useful Improvements in Insecticides; and I do hereby declare the following to be a full, clear, and exact description of the invention, such as will enable others skilled in the art to which it appertains to make and use the same.

This invention relates to improvements in insecticides, and it has more particular reference to a liquid composition for attracting and poisoning flies and similar noxious winged insects.

The composition consists of the following ingredients combined in the proportions stated, viz: arsenic trioxid, (white arsenic) 1280 grains, oxid of cobalt 2560 grains, asafetida 60 grains, brown sugar 1 pound, and sufficient water to make a gallon.

In the production of this composition the oxid of cobalt, arsenic trioxid and asafetida are thoroughly comminuted and mixed together in a mortar, the mixture being then added to the water in which the sugar has been previously dissolved, the water having been boiled prior to the addition of the sugar thereto. The whole composition is then placed in a can and sealed.

In use the mixture, after having been thoroughly shaken is poured to the desired amount, upon a plate or shallow pan which is then placed at the desired spot, the insects being attracted thereto by the odor of the asafetida present in the mixture. The arsenic trioxid and the oxid of cobalt, by reason of their poisonous nature positively kill the insects when the latter have eaten the composition, and do not merely deaden them as do the powdered compositions usually employed. The oxid of cobalt present in the composition settles to some extent, hence the necessity for thoroughly shaking the composition prior to using the same, and for utilizing a shallow dish or pan, it being understood that a sufficient quantity of such element is held in suspension to poison the insects when the composition is eaten.

What is claimed is:

A liquid insecticide consisting of arsenic trioxid, oxid of cobalt, asafetida, brown sugar and water.

In testimony whereof, I affix my signature, in presence of two witnesses.

HENRY S. DELAMERE.

Witnesses:
  H. C. HANSEN,
  D. H. SAWUSH.